(12) United States Patent
Shimata et al.

(10) Patent No.: US 10,198,957 B2
(45) Date of Patent: Feb. 5, 2019

(54) COMPUTER-BASED VIRTUAL TRAINER

(71) Applicant: Raytheon Company, Waltham, MA (US)

(72) Inventors: Blake S. Shimata, Tucson, AZ (US); Ruston K. Keeton, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 339 days.

(21) Appl. No.: 13/861,423

(22) Filed: Apr. 12, 2013

(65) Prior Publication Data
US 2014/0308647 A1    Oct. 16, 2014

(51) Int. Cl.
*G09B 7/00*     (2006.01)
*G09B 19/00*    (2006.01)

(52) U.S. Cl.
CPC ............... *G09B 7/00* (2013.01); *G09B 19/00* (2013.01); *G09B 19/003* (2013.01)

(58) Field of Classification Search
CPC ...... G06F 3/016; G06F 3/048; G06F 3/04895; G06F 9/453; G09B 5/00; G09B 5/02; G09B 7/00; G09B 19/003
USPC ......................................................... 434/362
See application file for complete search history.

(56) References Cited

U.S. PATENT DOCUMENTS

| | | | |
|---|---|---|---|
| 6,099,320 A | 8/2000 | Papadopoulos | |
| 6,271,843 B1 * | 8/2001 | Lection | G06T 15/00 434/62 |
| 6,371,765 B1 | 4/2002 | Wall et al. | |
| 6,968,315 B1 * | 11/2005 | Nakisa | G06Q 10/107 345/419 |
| 7,969,288 B2 * | 6/2011 | Braun et al. | 340/407.1 |
| 2002/0123812 A1 * | 9/2002 | Jayaram | G06T 19/20 700/98 |
| 2007/0264620 A1 * | 11/2007 | Maddix | G09B 19/003 434/219 |
| 2010/0064235 A1 | 3/2010 | Walls | |
| 2011/0022208 A1 * | 1/2011 | Bouffiou | G05B 19/41805 700/98 |
| 2014/0162224 A1 * | 6/2014 | Wallace | G09B 5/06 434/219 |

OTHER PUBLICATIONS

"Game engine—Wikipedia®, the free encyclopedia", [online]. [retrieved on Jun. 4, 2014]. Retrieved from the Internet: <URL: http://en.wikipedia.org/w/index.php?title=Game_engine&oldid=545815894>, (Mar. 20, 2013), 8 pgs.
"International Application Serial No. PCT/US2014/015753, International Search Report dated Jun. 18, 2014", 3 pgs.

(Continued)

Primary Examiner — Peter Egloff
(74) Attorney, Agent, or Firm — Schwegman Lundberg & Woessner, P.A.

(57) ABSTRACT

Embodiments of a system and method for generating a computer-based virtual training application are generally described herein. One embodiment for the method comprises generating input data, converting the input data to a predefined format for use by a virtual trainer framework, and generating the virtual training application comprising interactive displays, configured for use on a computer, in response to the virtual trainer framework rendering the input data in the predefined format.

15 Claims, 5 Drawing Sheets

(56) References Cited

OTHER PUBLICATIONS

"International Application Serial No. PCT/US2014/015753, Written Opinion dated Jun. 18, 2014", 7 pgs.
"User Guide for Google Apps Script", © 2010 Google. [online]. [retrieved on Aug. 3, 2012]. Retrieved from the Internet: <URL: <http://code.google.com/googleapps/appsscript/guide.html>, (Jan. 27, 2011). 36 pgs.
"Application Serial No. PCT/US2014/015753, International Search Report on Patentability dated Oct. 22, 2015", 8 pgs.
"European Application Serial No. 14707878.6, Communication Pursuant to Article 94(3) EPC dated Apr. 29, 2016", 6 pgs.
"European Application Serial No. 14707878.6, Summons to Attend Oral Proceedings Received dated Apr. 12, 2017", 8 pgs.
"European Application Serial No. 14707878.6, Response filed Aug. 18, 2016 to Communication Pursuant to Article 94(3) EPC dated Apr. 29, 2016", 29 pgs.
"European Application Serial No. 14707878.6, Response filed Dec. 19, 2017 to Summons to Attend Oral Proceedings Received dated Apr. 12, 2017", 27 Pgs.

\* cited by examiner

COMPUTER-BASED VIRTUAL TRAINER

TECHNICAL FIELD

Embodiments relate to computer-based training. Some embodiments relate to virtual computer-based training.

BACKGROUND

Computer-based training has typically been used successfully because it provides many advantages over conventional instructor-led training classes. Unlike a classroom in which the students and instructor meet physically in the same location at the same time, computer-based training can be made available to students at any time and place that is convenient for the individual students. Additionally, since individual students learn at different rates, computer-based training may allow students to learn at their own pace.

Computer-based training can employ two-dimensional images and text, typically controlled by a graphical user interface (GUI), that enable a student to answer questions, select images and videos, and generally interact with the training. However, generating dedicated computer-based training software can be expensive and time consuming. The computer-based training software is typically written by someone who is not only knowledgeable regarding writing computer code but also knowledgeable in the area for which the training software is meant to train. The alternative would be having multiple individuals to generate the same computer-based training software. Either scenario could be labor intensive and costly.

Thus, there are general needs for a computer-based virtual trainer. There are additional general needs for a cost-effective way to generate a computer-based virtual trainer.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
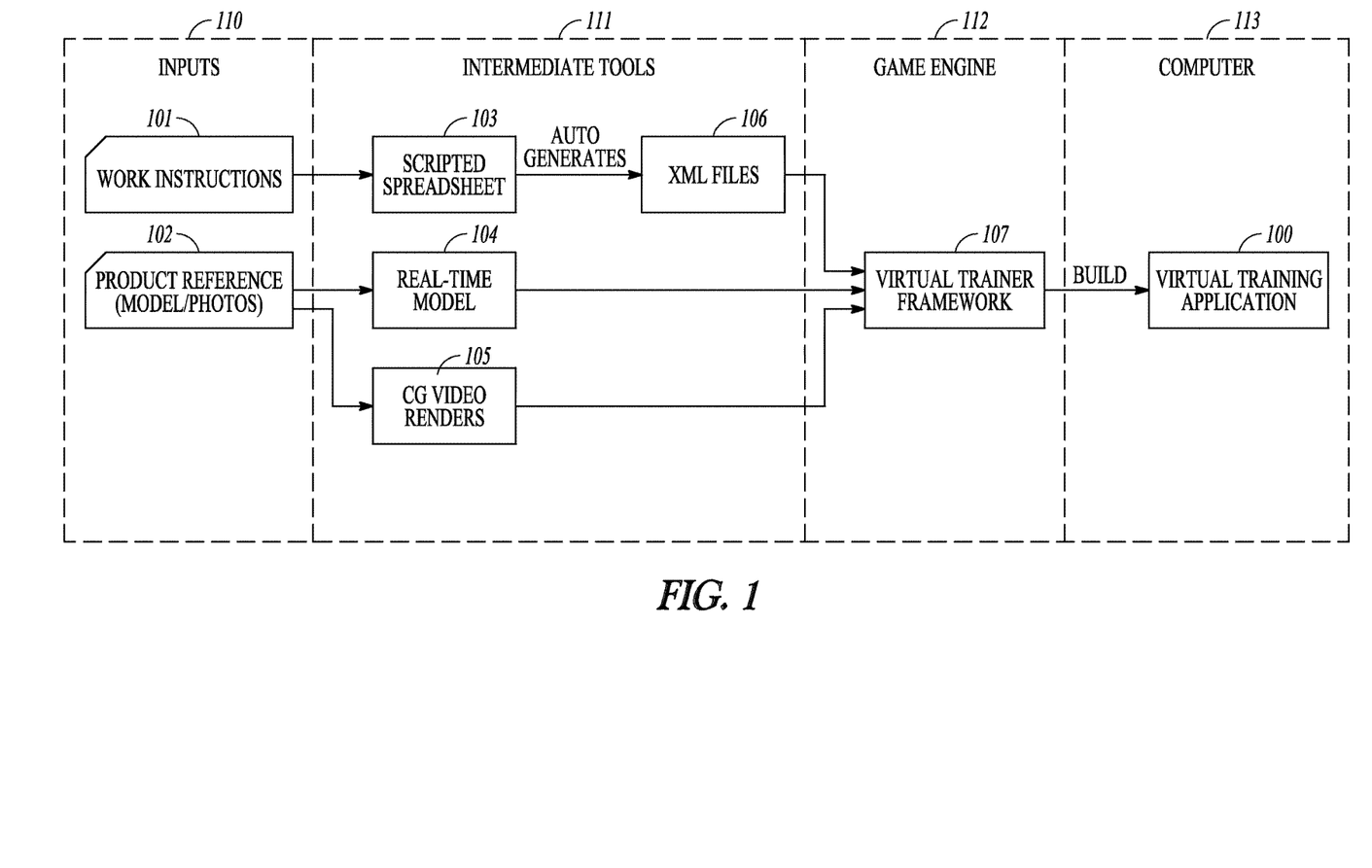
FIG. 1 shows a block diagram of one embodiment of a system for generating a computer-based virtual training application.

FIG. 1 illustrates a block diagram of one embodiment of a system for generating a computer-based virtual training application 100 that can be executed on a computer 113. The system can use a game engine 112 as the virtual trainer framework 107 to generate the virtual training application 100 from various input data 110. The generated virtual training application 100 can be stored in permanent memory (e.g., RAM, magnetic disk drive, solid state drive) of the computer 113 or stored in removable memory (e.g., removable disk/tape, flash drive).

Game engines are typically used by the video gaming industry for the creation and development of video games. The game engine can provide a software framework used by developers to create two dimensional (2D) or three dimensional (3D) graphics for video games as well as providing seamless interactivity with models and a virtual environment. In the present system, the game engine 112 can render the various training input data 110, after manipulation into predefined formats by intermediate tools 111, into a 3D virtual training application 100.

The various input data 110 to the system can include work instruction data 101 and product reference data 102. Alternate embodiments can include other input data 110 to the system. The input data 110 used can depend on the resulting virtual training application 100 desired to be rendered by the virtual trainer framework 107.

The work instructions 101 can include any text to be used during a virtual training session. For example, the work instructions 101 can include a description of a product that is involved in the training. The work instructions 101 can further include a description of each sub-assembly of a product that has multiple parts, a description of how to assemble/disassemble those sub-assemblies into the final assembly, a description of how to repair the product, test questions for the testing mode of the virtual training, and/or a description of tools that can be used in assembly, disassembly, and/or repair of the product. The listed work instructions 101 are for purposes of illustration only as alternate embodiments might use other work instructions 101, depending on the desired virtual trainer to be rendered.

The product reference material 102 can include the models and/or images of a product for which the virtual training application 100 is to be used to train. The reference material 102 can be in the form of image data, photographs, computer data that describes a 3D model and all of its sub-assemblies, and/or any other product reference that can be used to visually describe a product. The product reference materials 102 listed are for purposes of illustration only as alternate embodiments might use other reference materials 102, depending on the desired virtual trainer to be rendered.

The virtual trainer input data 110 can be input to a set of intermediate tools 111. The intermediate tools 111 can be used to condition the input data 110 in order to generate the proper predefined formats used by a particular game engine 112 for rendering the final virtual training application 100.

The intermediate text tools can include a scripted spreadsheet 103 that can be used to automatically generate extensible markup language (XML) files 106 for input to the virtual trainer framework 107. A user can input the text directly into the scripted spreadsheet 103 or the text can be imported into the appropriate fields of the scripted spreadsheet 103 from some other user input (e.g., text file, word processor output file). The script for each dedicated field of the spreadsheet can then automatically generate the XML data appropriate for the text that is in that particular field. The generated XML data is stored in one or more XML files 106. The resulting XML file(s) 106 can then be output to the game engine 112.

The product reference material 102 can be input to the set of intermediate tools 111. The intermediate tools 111 can then be used to condition the input models and/or images of the product into the proper format used by the game engine 112.

The intermediate tools 111 includes a real-time model generator 104 that can use computer aided design technology to generate a 3D model of the product that is purpose of the particular virtual training application 100. The real-time model generator 104 can take an image and use a graphical engine (e.g., vector based graphics, raster based graphics) to generate the appropriately scaled dimensions of the product in three dimensions. The real-time model generator 104 can generate the 3D images of the separate sub-assemblies that make up the final product including how the sub-assemblies fit together as the final product, the surface textures, materials, and colors. In one embodiment, the 3D images can be generated by a graphics artist using graphics software. This data can be input to the game engine 112.

The intermediate tools 111 can also include a computer graphic (CG) video rendering generator 105. The CG video rendering generator 105 can take the input image data from the inputs 110 and generate the appropriate CG video data for that particular product. For example, for an automobile engine product, the CG video rendering generator 105 can use the image data to generate the movement of the internal sub-assemblies of the engine. In one embodiment, the CG video data can be generated by a graphics artist using graphics software. The rendered CG video data can then be output to the game engine 112.

The game engine 112 can be a virtual trainer framework 107. The virtual trainer framework 107 can take various inputs (e.g., CG video, video, text, 3D CAD models, images) and combine those inputs without having to reconfigure, customize, or generate code. Thus, a user desiring to generate a computer-based virtual trainer application 100 does not have to be technically trained or even know how the virtual trainer framework 107 operates. After combining all of the various conditioned inputs, the virtual trainer framework 107 can then output the computer-based virtual training application 100.

The inputs 110, intermediate tools 111, and game engine 112 can be implemented in hardware, software, or a combination of both. For example, the inputs 110 might be one hardware module that includes a keyboard and/or scanning device for entering text, images, models, and other forms of work instruction data and product reference data. The inputs hardware module 110 can be coupled to an intermediate tools 111 hardware module. The intermediate tools hardware module 111 might also include the CAD hardware/software and CG rendering hardware/software to generate the necessary CAD data and CG rendered video data for the game engine 112. The game engine 112 might be another hardware module that is coupled to the intermediate tools hardware module 111.

Each of the hardware modules 110-112 might include the input/output devices to communicate with the respective hardware module to which they are coupled. For example, the input/output devices might include USB ports, Ethernet, and/or wireless communication capabilities.

In another embodiment, the inputs 110, intermediate tools 111, and game engine 112 might be software modules in one computer workstation. For example, a single dedicated virtual trainer generation computer might include all of the inputs 110, intermediate tools 111, and game engine 112 modules for generating the virtual training application 100.

The resulting virtual training application 100 can include a progressive learning experience for a user through different modes of interactivity. For example, the progressive modes might include a familiarize mode, a review mode, a practice mode, and a test mode. Depending on the user's experience level, the user can progress through the various modes, or even skip one or more modes, at their own pace.

Prior to using the computer-based virtual trainer application, the user can log into application so that a personal record of the user's progress through the training can as well as the user's success with the practice and test modes can be maintained. The personal record can then be made available to the user's supervisors for later review.

Figure 2:
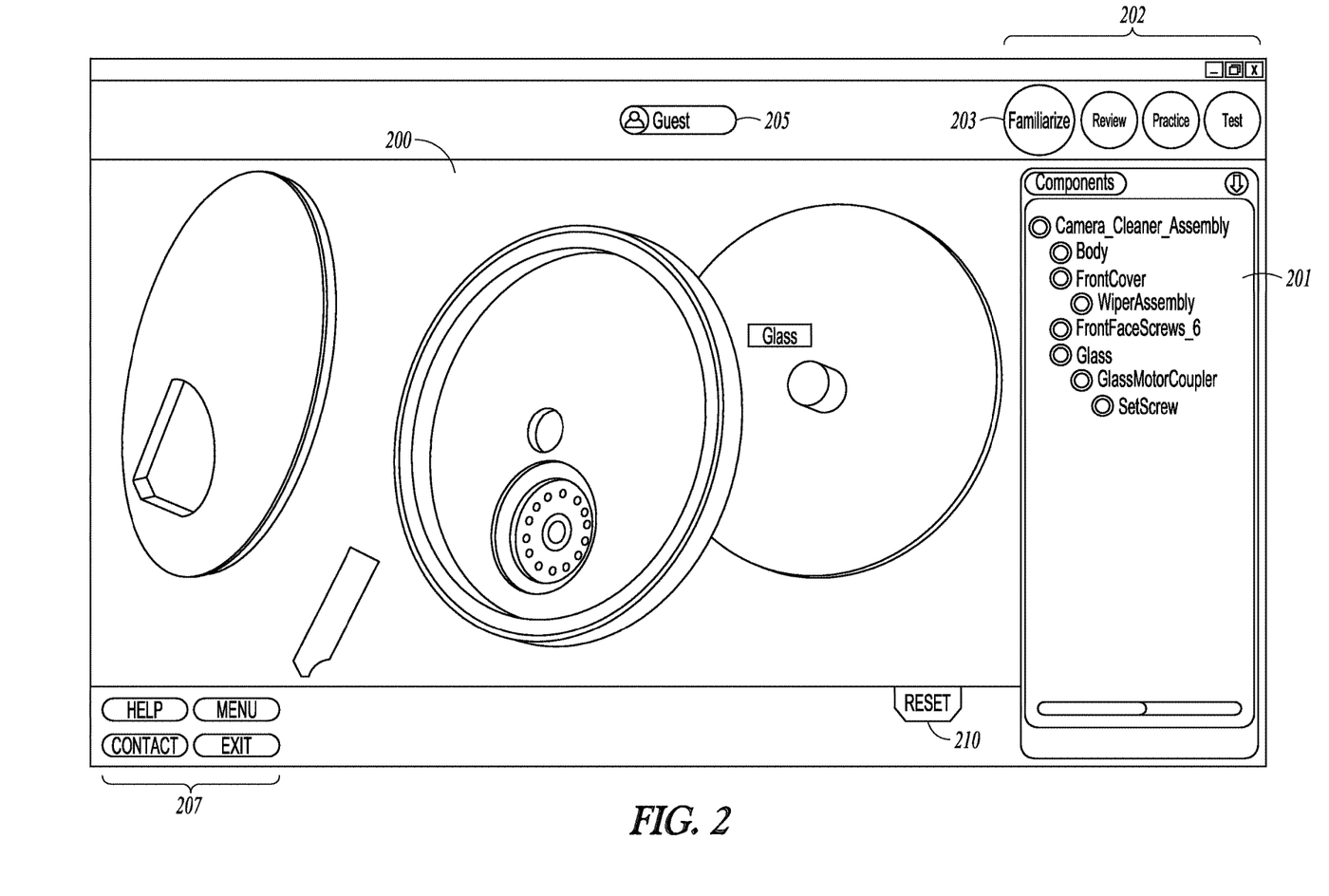
FIG. 2 shows a diagram of one embodiment of a computer-based virtual training application display in a familiarize mode.

The familiarize mode can provide translation of a product in full 3D space. The user can view the product from any angle as well as remove and move any sub-assemblies for the product. The user can mouse-over the sub-assemblies to identify that particular sub-assembly. In one embodiment, if the user clicks on a particular sub-assembly, that sub-assembly can be highlighted while the rest of the product might dim. Information about that particular sub-assembly might then be displayed on the screen.

FIG. 2 illustrates a diagram of one embodiment of a computer-based virtual training application display in the familiarize mode. This mode can display the 3D views 200 of the assembly and sub-assemblies. By placing the cursor on each assembly and sub-assembly, the user can drag and rotate each displayed item.

When the user is logged-in, the user name icon 205 can be displayed on the screen. The user can click on the user name icon 205 to either log in or to log out.

A row of icons 202 can be used to show and control selection of the different modes of the virtual training application. For example, the "FAMILIARIZE" mode icon 203 is larger than the rest of the icons 202 thus indicating that the familiarize mode is now active. The user can click on another of these icons 202 in order to select that particular mode.

A sidebar 201 can be used to list the various sub-assemblies of the product. Clicking on any of the listed sub-assemblies can highlight that particular sub-assembly on the display 200.

A navigation area of icons 207 can be used to perform various navigation functions in the virtual training application. For example, clicking on a "HELP" icon can bring up a help page to instruct the user on how to use the virtual training application. Clicking on a "CONTACT" icon can bring up a list of contact information if the user needs more extensive help. A "MENU" icon can be used to bring up a menu screen on the display that could list the main functions of the virtual training application. Clicking on an "EXIT" icon can log the user out and exit the application.

A "RESET" tab 210 can be clicked by the user to reset the displayed sub-assemblies back to a known initial state. For example, if a number of sub-assemblies have been taken apart by the user during the familiarization mode, the user can then click on the "RESET" tab 210 to rapidly reassemble the product into its initial, assembled state.

The review mode can provide the user with a list of tasks to be performed such as assembly, disassembly, and/or repair. This mode can also use CG rendered video to display the various tasks. This mode can also include CG rendered videos to illustrate operation of the product and/or its sub-assemblies.

Figure 3:
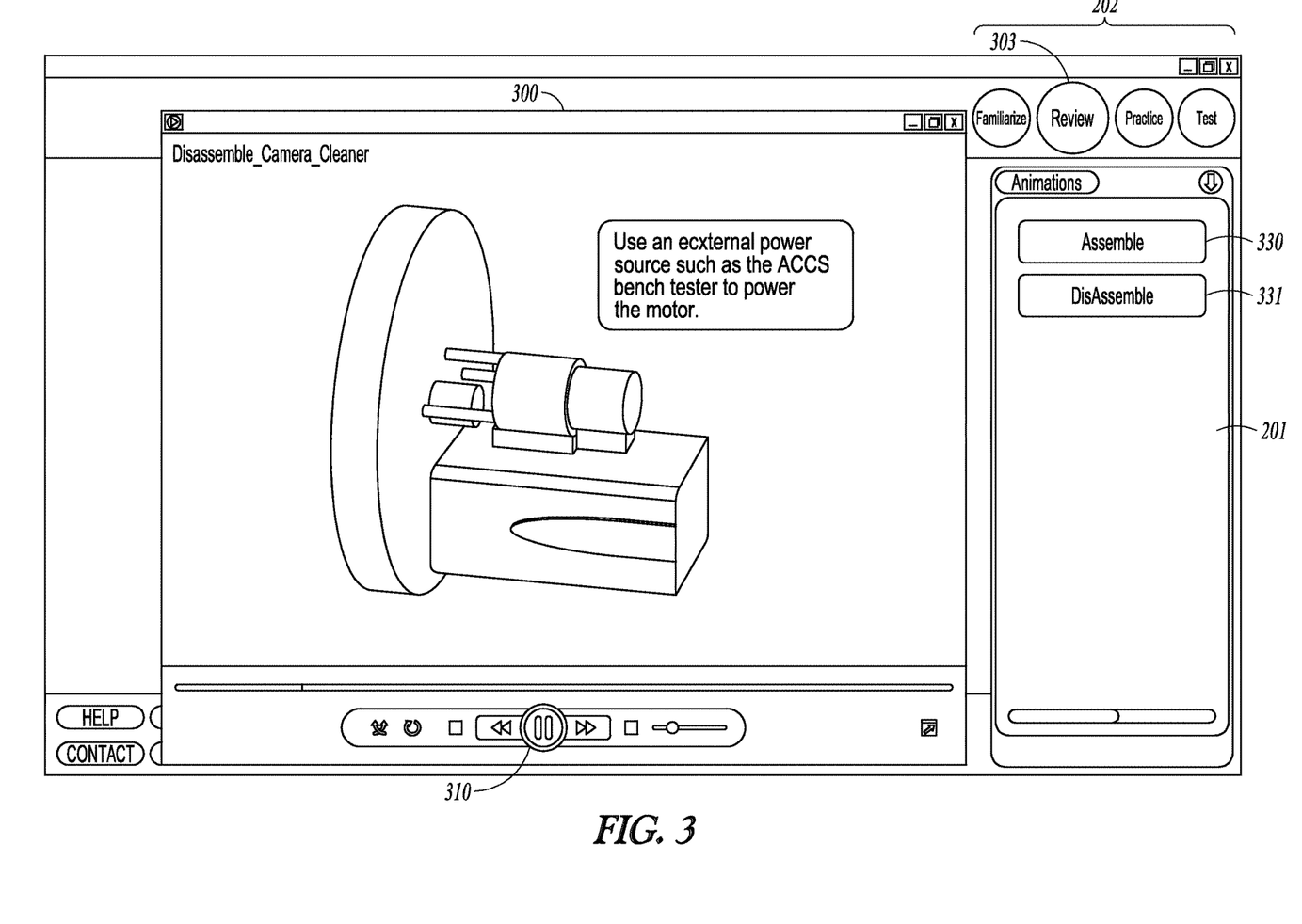
FIG. 3 shows a diagram of another embodiment of a computer-based virtual training application display in a review mode.

FIG. 3 illustrates a diagram of one embodiment of a computer-based virtual training application display in the review mode. As in the other modes, the display shows the row of icons 202 to indicate and control selection of the different modes of the virtual training application. In the illustrated mode, the "REVIEW" icon 303 is larger to indicate that the review mode is active.

The sidebar 201 can show the various tasks to be performed. In one embodiment, these task indications can be icons 330, 331. When the user clicks on a particular icon 330, 331, the task indicated by that particular icon can be shown in a CG rendered video 300. For example, if the user would like to watch an assembly task, the user would click on the "ASSEMBLE" icon 330. This can cause the virtual training application to bring up the CG rendered video display 300 with text. The user can then use the video control bar 310 to control the displayed video 300. For example, the user can play, pause, fast forward, and reverse the video using the video control bar 310. The video display 300 can visually illustrate each step used to perform the selected task.

Figure 4:
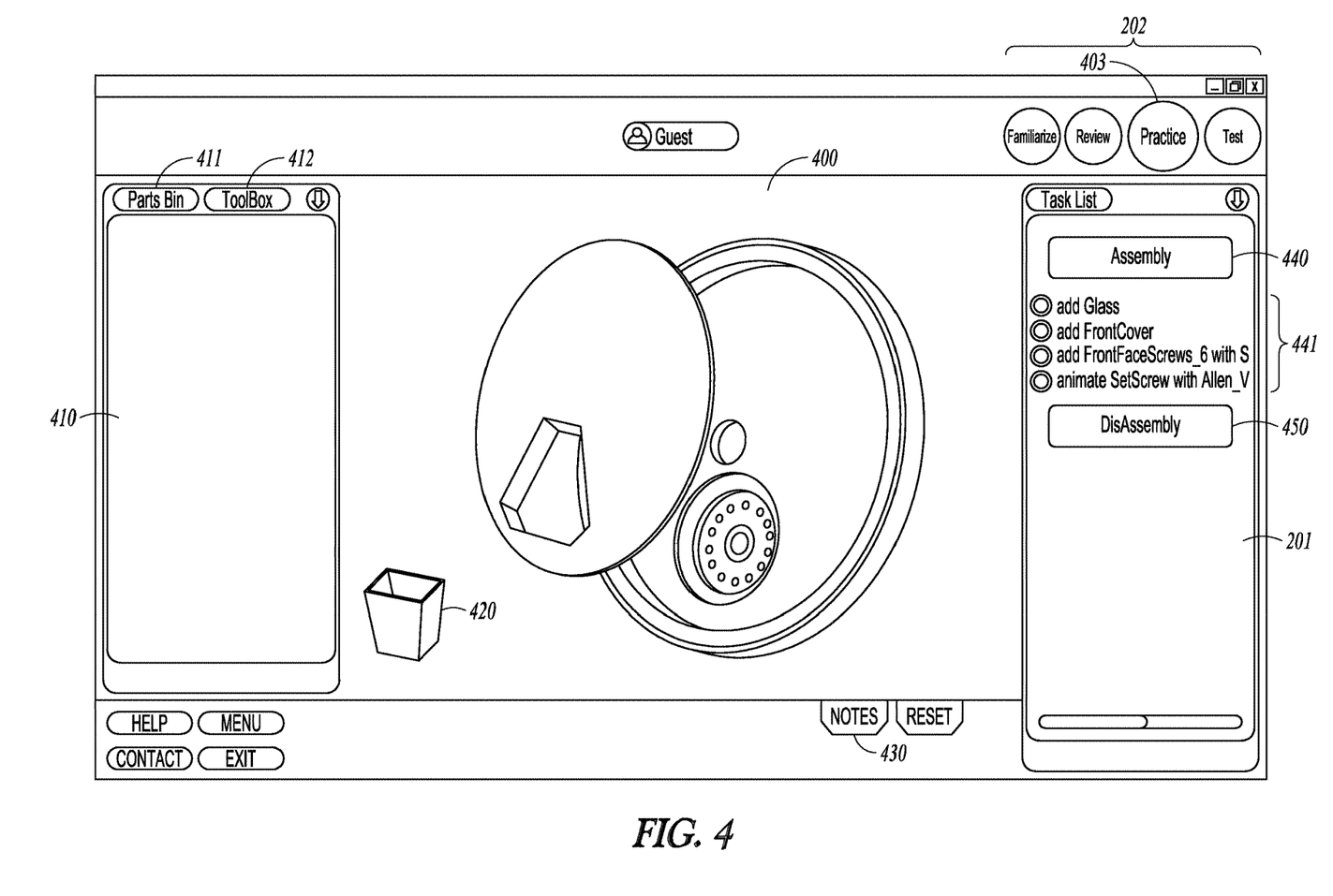
FIG. 4 shows a diagram of another embodiment of a computer-based virtual training application display in a practice mode.

The practice mode can provide the user with the ability to practice any of the already taught tasks. For example, if the virtual training application has gone over the assembly, disassembly, and/or repair of a product, the practice mode can enable the user to practice each of these tasks on a 3D model of the product. The user can be given displays of the product 400, a list of tasks in the sidebar 201, and a list of tools 410 that can be used during the practice session.

FIG. 4 illustrates a diagram of one embodiment of a computer-based virtual training application display in the practice mode. As in the other modes, the display shows the row of icons 202 to indicate and control selection of the different modes of the virtual training application. In the illustrated mode, the "PRACTICE" icon 403 is larger to indicate that the practice mode is active.

In order to practice a particular task, the user can click on one of the icons 440, 441 in the task sidebar 201. For example, clicking on the "ASSEMBLY" icon 440 can bring up a sub-list of tasks 441 that can be performed to accomplish the assembly task. Selecting the assembly task can also bring up a second sidebar 410 for parts and tools that can be used to complete the selected task.

The second sidebar 410 can include icons 411, 412 that might be used to bring up parts, tools, or other items to be used during the selected task. For example, clicking on the "TOOL BOX" icon 412 might bring up a list of tools that the user can select during the practice session. The selected tool can then appear on the display 400 for use by the user. The user can click on that displayed tool in order to accomplish the desired task.

Similarly, clicking on the "PARTS BIN" icon 411 might bring up a list of parts that the user can select during the practice session. The selected part can then appear on the display 400 for use by the user. The user can also remove parts during the session and place them in the recycle bin 420. These parts can then be added to the parts bin in the second sidebar 410 for future use in another task.

Clicking on a "NOTES" tab 430 can bring up a text entering page on which the user can write notes. For example, if the user would like to write down a particular note regarding an assembly task for future reference, the user can use the "NOTES" tab 430.

The practice mode can be different than the subsequently described test mode. While the user is practicing the selected task, the virtual training application can prevent the user from performing a step in the wrong order or in the wrong way. The virtual training application might then have the user re-review the particular video for that step before allowing the user to proceed.

The test mode, is substantially similar to the practice mode. However, the test mode tracks the user as a particular task is performed. This mode may not stop the user from doing a task incorrectly but can record the user's incorrect performance in the background for later review. This mode can also generate a score sheet that scores the users success or failure in the particular task.

Figure 5:
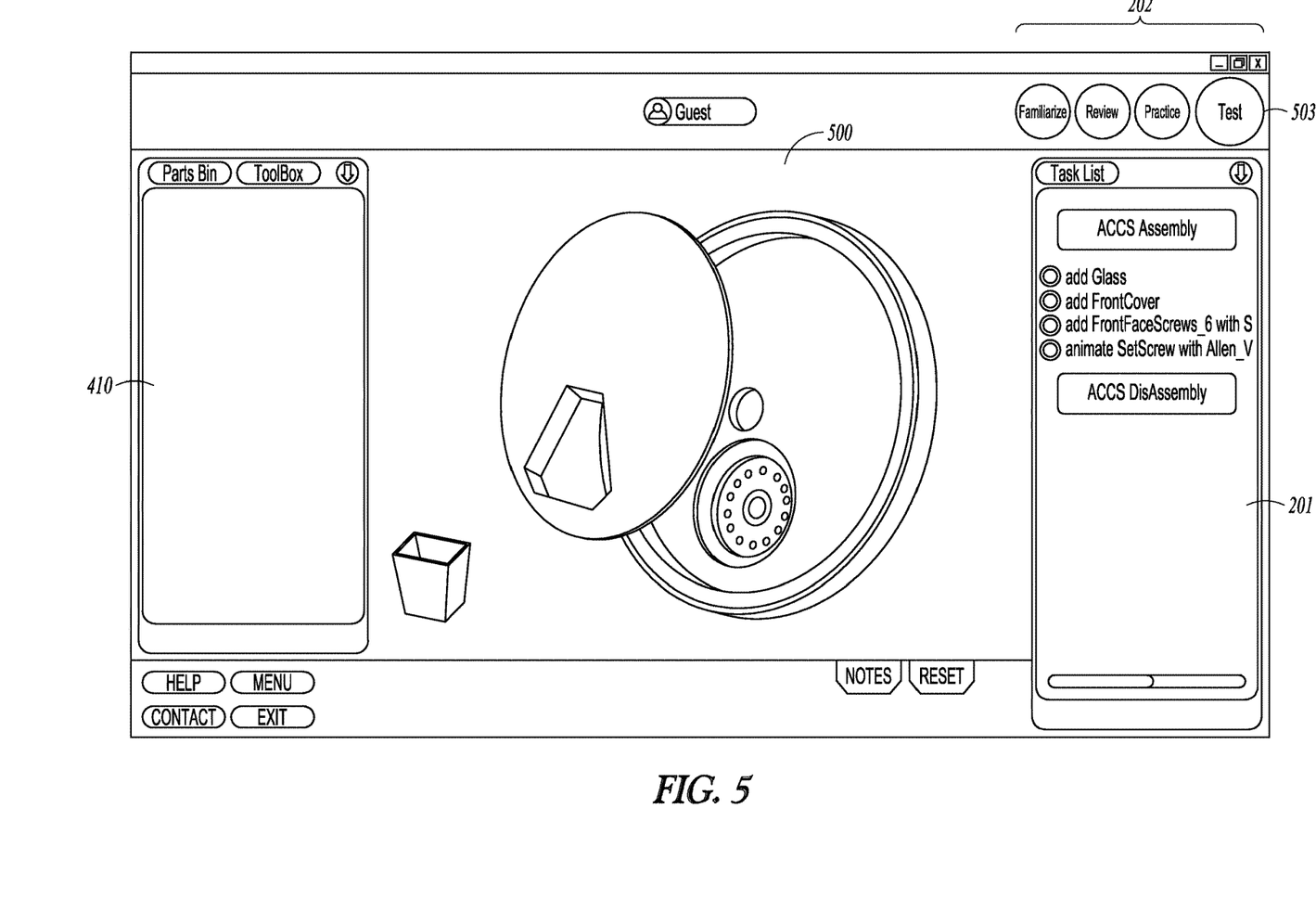
FIG. 5 illustrates a diagram of one embodiment of a computer-based virtual training application display in the practice mode.

FIG. 5 illustrates a diagram of one embodiment of a computer-based virtual training application display in the practice mode. Like the practice mode, this mode shows the selected "TEST" mode icon 503 as being larger than the other mode icons 202. This mode also displays the sidebar 201 of selectable tasks as well as the second sidebar 410 of the selectable parts and tools. The display includes the 3D model of the product on which the user is to perform a selected task.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A processor implemented method for generating a computer-based virtual trainer for a product, the method comprising:
   displaying a first window on a computer screen containing fields to accept product related input data comprising text data, product image data, a description of each sub-assembly of the product, assembly instructions for assembling each sub-assembly into the product, disassembly instructions for disassembling the product into the sub-assemblies, product repair instructions, and product models to be displayed on the virtual trainer;
   converting the product related input data, input to a scripted spreadsheet, to an extensible markup language (XML) file in response to a script for each of a plurality of fields in the spreadsheet, the XML file for use by a game engine in response to a type of product related input data; and
   displaying a second window on the computer screen comprising the virtual trainer with user interactive displays in response to the game engine rendering the product related input data that is in the plurality of predefined formats, the user interactive displays comprising an interactive, three-dimensionally rendered product image, comprising a scaled product image, a plurality of scaled product sub-assembly images, and how the scaled product sub-assembly images fit together to form the scaled product image, wherein the scaled product image and the plurality of scaled product sub-assembly images are configured to be manipulated by a user of the virtual trainer during a plurality of training modes including,
   a familiarize mode wherein user interaction using a cursor during a cursor mouse-over of each sub-assembly image highlights the respective sub-assembly image and causes display of a respective description of the sub-assembly, wherein the scaled product and product sub-assembly images are translatable in a three-dimensional space of the second window by user interaction using a cursor, the three-dimensionally rendered scaled product images and scaled product sub-assembly images, and a menu; and
   a review mode wherein user selection of a respective task from a list of tasks including an assembly task, a disassembly task and a repair task causes display of a corresponding task video to show performance of the selected respective task with corresponding assembly instructions, disassembly instructions or repair instructions, wherein user interaction using a video control displayed in the second window controls play of the corresponding task video; and a practice mode wherein selection of a task from a list of tasks including an assembly task, a disassembly task and a repair task causes display of a sub-list of tasks and causes display of parts and tools to complete one or more tasks of the sub-list of tasks, wherein movement of one or more displayed tools and one or more displayed parts is displayed by user interaction with the cursor to simulate performance of a task from the sub-list of tasks, and wherein a user is prevented from incorrectly performing the task from the sub-list of tasks.

2. The method of claim 1 wherein converting the product related input data to one of the plurality of predefined formats comprises converting the text data to an extensible markup language (XML) file and the product image data to computer aided design files and computer graphic video rendered files.

3. The method of claim 1 further comprising generating work instruction text data and product reference data from the product related input data.

4. The method of claim 3 wherein generating the work instruction text data comprises generating text files configured to be input to a spreadsheet.

5. A processor implemented method for generating a computer-based, three dimensional, virtual trainer for a product, the method comprising:

displaying a first window on a computer screen containing fields for inputting work instruction data and product reference data into intermediate tools, the work instruction data comprising product related text for display, a description of each sub-assembly of the product, assembly instructions for assembling each sub-assembly into the product, disassembly instructions for disassembling the product into the sub-assemblies, product repair instructions, and the product reference data comprising images of the product for display;

the intermediate tools converting the work instruction data into extensible mark-up language data in response to a script of a scripted spreadsheet for each of a plurality of fields in the spreadsheet and the images into three dimensional model data and computer graphic rendered video data;

a game engine combining the extensible mark-up language data, three dimensional model data, and computer graphic rendered video data into the computer based virtual training application and displaying a second window on the computer screen containing an interactive, three dimensional rendering of the three dimensional model data and computer graphic rendered video data, comprising a scaled product image, a plurality of scaled product sub-assembly images, and how the scaled product sub-assembly images fit together to form the scaled product image, wherein the interactive, three dimensional rendering is configured to be manipulated by a user of the virtual trainer during a plurality of training modes including a, familiarize mode wherein user interaction using a cursor during a cursor mouse-over of each sub-assembly image highlights the sub-assembly to identify the respective sub-assembly image and causes display of a respective text description of the sub-assembly, wherein the scaled product image and the plurality of scaled product sub-assembly images are translatable in a three-dimensional space of the second window by user interaction using a cursor, the three-dimensionally rendered scaled product images and scaled product sub-assembly images, and a menu;

a review mode wherein user selection of a respective task from a list of tasks including an assembly task, a disassembly task and a repair task causes display of a corresponding task video to show performance of the selected respective task with corresponding assembly instructions, disassembly instructions or repair instructions, wherein user interaction using a video control displayed in the second window controls play of the corresponding task video; and a practice mode wherein selection of a task from a list of tasks including an assembly task, a disassembly task and a repair task causes display of a sub-list of tasks and causes display of parts and tools to complete one or more tasks of the sub-list of tasks, wherein movement of one or more displayed tools and one or more displayed parts is displayed by user interaction with the cursor to simulate performance of a task from the sub-list of tasks, and wherein a user is prevented from incorrectly performing the task from the sub-list of tasks.

6. The method of claim 5 wherein the intermediate tools converting the work instruction data into extensible mark-up language data comprises:

inputting the work instruction data into a plurality of fields of a scripted spreadsheet of the intermediate tools; and the scripted spreadsheet generating the extensible mark-up language data in response to a script for each of the plurality of fields of the spreadsheet.

7. The method of claim 6 wherein inputting the work instruction data into the plurality of fields of the scripted spreadsheet comprises inputting different work instruction data into each of the plurality of fields of the scripted spreadsheet wherein each field, comprising a different script, is configured to generate different extensible mark-up language data in response to each script.

8. The method of claim 5 wherein the intermediate tools converting the images into three dimensional model data comprises the intermediate tools converting the images into computer aided design data.

9. A system for generating a computer-based, three dimensional, virtual trainer for a product, the system comprising:

an input module configured to generate, from a scripted spreadsheet, work instruction data and product reference data for display on the virtual trainer;

an intermediate tool module coupled to the input module and configured to generate, based on a script for each of a plurality of fields in the scripted spreadsheet, extensible mark-up language data from the work instruction data and computer aided design data and computer graphic rendered video data from the product reference data, the product reference data comprising product related input data comprising text data, product image data, a description of each sub-assembly of the product, assembly instructions for assembling each sub-assembly into the product, disassembly instructions for disassembling the product into subassemblies, and product repair instructions;

a game engine coupled to the intermediate tool module and configured to generate the computer-based virtual trainer by combining the extensible mark-up language data, the computer aided design data, and the computer graphic rendered video data and a computer screen coupled to the game engine and configured to display a window comprising an interactive, three dimensional rendering of the virtual trainer, comprising a scaled product image, a plurality of scaled product sub-assembly images, and how the scaled product sub-assembly images fit together to form the scaled product image, wherein the three dimensional rendering is configured to be manipulated by a user of the virtual trainer during a plurality of training modes including, a familiarize mode wherein user interaction using a cursor during a cursor mouse-over of each sub-assembly image highlights the respective sub-assembly image and causes display of a respective description of the sub-assembly, wherein the scaled product image and product sub-assembly images are translatable in a three-dimensional space of the second window by user interaction using a cursor, the three-dimensionally rendered, scaled product and product sub-assembly images, and a menu; and a review mode wherein user selection of a respective task from a list of tasks including an assembly task, a disassembly task and a repair task causes display of a corresponding task video to show performance of the selected respective task with corresponding assembly instructions, disassembly instructions or repair instructions, wherein user interaction using a video control displayed in the second window controls play of the corresponding task video; and a practice mode wherein selection of a task from a list of tasks including an assembly task, a disassembly task and a repair task causes display of a sub-list of tasks and causes display of parts and tools to complete one or more tasks of the sub-list of tasks, wherein movement of one or more displayed tools and one or more displayed parts is displayed by user interaction with the cursor to simulate performance of a task from the sub-list of tasks, and wherein a user is prevented from incorrectly performing the task the task from the sub-list of tasks.

10. The system of claim 9 wherein the intermediate tool module further comprises a real-time model generator configured to generate three-dimensional images of separate sub-assemblies of the product.

11. The system of claim 10 wherein the real-time model generator is coupled to the game engine and configured to input the three-dimensional images to the game engine.

12. The system of claim 9 wherein intermediate tool module is further configured to render computer graphic video data of sub-assemblies of the product.

13. A non-transitory computer-readable storage medium that stores instructions for execution by a computer to generate a virtual trainer for a product by performing the following operations:

accept input data into a scripted spreadsheet, the input data comprising product related input data comprising text data, product image data, a description of each sub-assembly of the product, assembly instructions for assembling each sub-assembly into the product, disassembly instructions for disassembling the product into sub-assemblies, product repair instructions, and product models to be displayed on the virtual trainer;

convert the input data into predefined formats for use by a game engine, wherein the predefined formats comprise extensible mark-up language, computer aided design data, and computer generated rendered video data for display on the virtual trainer, the input data converted in response to a script for each of a plurality of defined fields in the spreadsheet;

render the virtual training application with the game engine into a window of a computer screen by combining the data in the predefined formats into the virtual trainer, the window display comprising a three dimensionally rendered scaled product image, a plurality of scaled product sub-assembly images, and how the scaled product sub-assembly images fit together to form the scaled product image; and accept inputs from a user of the virtual trainer, the inputs comprising interactive manipulation of the three dimensionally rendered, scaled product image and the plurality of scaled product sub-assembly images, wherein the accepted inputs from the user provide translation of the scaled product image and the scaled product sub-assembly images in a three dimensional space of the window display by user interaction using a cursor, the three dimensionally rendered scaled product image and the scaled product sub-assembly images, and a menu wherein the three dimensionally rendered scaled product image and the scaled product sub-assembly images are configured to be manipulated by a user of the virtual trainer during a plurality of training modes including, a familiarize mode wherein user interaction using a cursor during a cursor mouse-over of each sub-assembly image highlights the the respective sub-assembly image and causes display of a respective description of the sub-assembly, wherein the scaled product image and product sub-assembly images are translatable in a three-dimensional space of the second window by user interaction using a cursor, the three-dimensionally rendered, scaled product and product sub-assembly images, and a menu; and a review mode wherein user selection of a respective task from a list of tasks including an assembly task, a disassembly task and a repair task causes display of a corresponding task video to show performance of the selected respective task with corresponding assembly instructions, disassembly instructions or repair instructions, wherein user interaction using a video control displayed in the second window controls play of the corresponding task video; and a practice mode wherein selection of a task from a list of tasks including an assembly task, a disassembly task and a repair task causes display of a sub-list of tasks and causes display of parts and tools to complete one or more tasks of the sub-list of tasks, wherein movement of one or more displayed tools and one or more displayed parts is displayed by user interaction with the cursor to simulate performance of a task from the sub-list of tasks, and wherein a user is prevented from incorrectly performing the task the task from the sub-list of tasks.

14. The computer-readable storage medium of claim 13 wherein the instructions are further configured to:

convert text to the extensible mark-up language in response to a script in a spreadsheet.

15. A non-transitory computer-readable storage medium that stores instructions for execution by a computer for a virtual training application for a product by performing the following operations:

operate a user input mode wherein the user inputs comprise product related input data comprising text data, product image data, a description of each subassembly of the product, assembly instructions for assembling each subassembly into the product, disassembly instructions for disassembling the product into the sub-assemblies, product repair instructions, and product models to be displayed on the virtual trainer;

operate an interactive familiarize mode wherein user interaction using a cursor during a cursor mouse-over of each sub-assembly image highlights the respective sub-assembly image and causes display of a respective description of the sub-assembly, wherein the scaled product and product sub-assembly images are translatable in a three-dimensional space of the second window by user interaction using a cursor, the three-dimensionally rendered scaled product images and scaled product sub-assembly images, and a menu;

operate a review mode a review mode wherein user selection of a respective task from a list of tasks including an assembly task, a disassembly task and a repair task causes display of a corresponding task video to show performance of the selected respective task with corresponding assembly instructions, disassembly instructions or repair instructions, wherein user interaction using a video control displayed in the second window controls play of the corresponding task video;

operate a practice mode wherein selection of a task from a list of tasks including an assembly task, a disassembly task and a repair task causes display of a sub-list of tasks and causes display of parts and tools to complete one or more tasks of the sub-list of tasks, wherein movement of one or more displayed tools and one or more displayed parts is displayed by user interaction with the cursor to simulate performance of a task from the sub-list of tasks, and wherein a user is prevented from incorrectly performing the task from the sub-list of tasks; and operate a test mode wherein selection of a task from a list of tasks including an assembly task, a disassembly task and a repair task causes display of a sub-list of tasks and causes display of parts and tools to complete one or more tasks of the sub-list of tasks, wherein movement of one or more displayed tools and one or more displayed parts is displayed by user interaction with the cursor to simulate performance of a task from the sub-list of tasks, and wherein a score indicates a user's success or failure in performing the task from the sub-list of tasks.

* * * * *

UNITED STATES PATENT AND TRADEMARK OFFICE
CERTIFICATE OF CORRECTION

PATENT NO. : 10,198,957 B2  
APPLICATION NO. : 13/861423  
DATED : February 5, 2019  
INVENTOR(S) : Shimata et al.

Page 1 of 1

It is certified that error appears in the above-identified patent and that said Letters Patent is hereby corrected as shown below:

On the Title Page

On page 2, in Column 1, under "Other Publications", Line 7, delete "Search" and insert --Preliminary-- therefor In the Drawings Sheet 3 of 5, Fig. 3, Line 1, delete "ecxternal" and insert --external-- therefor In the Claims In Column 7, Line 62, in Claim 5, delete "including a," and insert --including,-- therefor In Column 7, Line 63, in Claim 5, before "familiarize", insert --a--

In Column 9, Line 41, in Claim 9, delete "the task the task" and insert --the task-- therefor In Column 10, Line 30, in Claim 13, delete "the the" and insert --the-- therefor In Column 10, Line 56, in Claim 13, delete "the task the task" and insert --the task-- therefor Signed and Sealed this  
Twenty-first Day of April, 2020

Andrei Iancu  
*Director of the United States Patent and Trademark Office*